Feb. 16, 1943.                K. M. WATSON                2,311,273
                          HYDROCARBON CONVERSION
                            Filed April 6, 1940
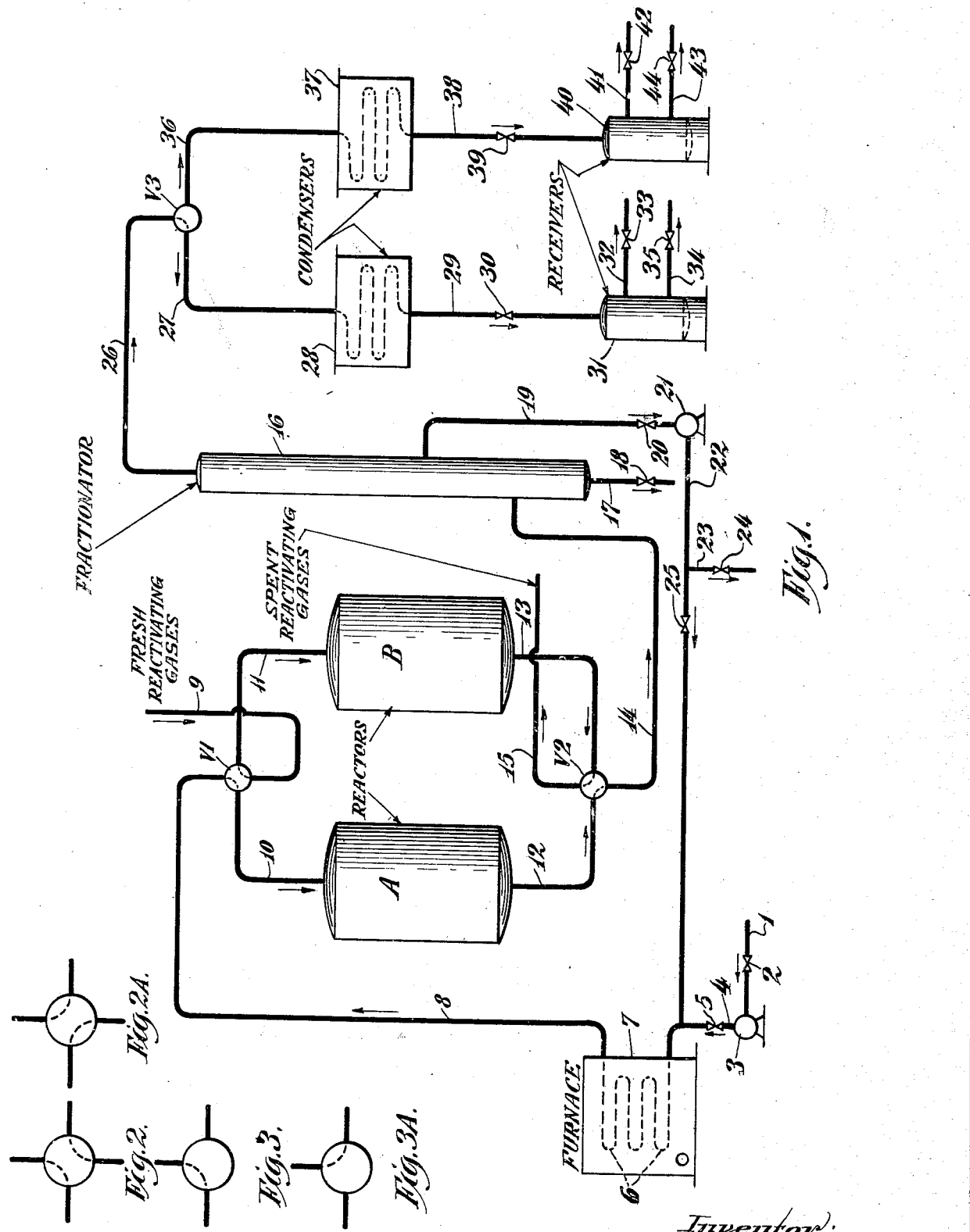
Inventor:
Kenneth M. Watson
By Lee J. Gary
              Attorney.

Patented Feb. 16, 1943

2,311,273

UNITED STATES PATENT OFFICE 2,311,273

HYDROCARBON CONVERSION

Kenneth M. Watson, Chicago, Ill., assignor to Universal Oil Products Company, Chicago, Ill., a corporation of Delaware Application April 6, 1940, Serial No. 328,201

5 Claims. (Cl. 196—52)

This invention relates to a process for converting hydrocarbon oil into gasoline of relatively high octane rating and more specifically to a hydrocarbon conversion process employing fixed catalyst beds which are alternately processed and reactivated wherein conditions during reactivation and processing are so correlated that an approximately uniform rate of gasoline production is obtained.

In catalytic conversion reactions, such as, for example, catalytic cracking, carbonaceous material is deposited upon the catalyst during the period in which conversion of the hydrocarbon reactants is effected. The deposition of carbonaceous material quite naturally diminishes the active surface of the catalyst resulting in a decrease in activity and subsequently a lower rate of conversion of the hydrocarbon reactants to gasoline, particularly in the cases where uniform temperatures are maintained in the catalyst bed and a uniform volume of reactants subjected to contact with the catalyst.

Unless some physical or chemical change has taken place in the catalyst particles usually resulting after prolonged use, the activity of the catalyst upon which the carbonaceous materials are deposited is only temporarily impaired so that with the removal of these carbonaceous materials the catalyst may be restored to its original activity. The usual method of reactivating the mass of catalytic material involves passing reactivating gases containing controlled minor amounts of oxygen in contact with said mass at a temperature usually above 900° F. whereby combustion of the carbonaceous material is effected, the resulting combustion products being withdrawn along with the spent reactivating gases from the zone containing the mass of catalytic material. Usually after reactivation, the mass of catalytic material is at a temperature above that preferred in the hydrocarbon conversion reaction. As a result, therefore, when the hydrocarbon reactants are brought in contact with a freshly reactivated mass of catalytic material the rate of conversion to gasoline during the first 5 to 15 minutes of the processing period will ordinarily be considerably higher than the rate of conversion during the later stage of the processing period. The deposition of carbonaceous material during the early stages of the processing period likewise is greater than the deposition of carbonaceous material in the later stage and this, together with the lower catalyst bed temperature as above mentioned, causes the decrease in conversion.

In view of the above, my invention provides for supplying reactivating gases to the bed of catalytic material to be reactivated at a temperature preferably in the range of 750 to 850° F. whereby the bed of catalytic material after reactivation remains at a relatively low temperature so that when the hydrocarbon reactants preferably heated to a temperature of 900 to 1050° F. are passed in contact with the freshly reactivated catalytic material the high temperature stream of reactants heats the relatively cool catalyst bed at a rate tending to compensate for diminishing catalyst activity by increased temperature resulting in an approximately uniform rate of gasoline production.

When employing conditions as above described, the process of the invention will produce a substantially saturated high octane rating gasoline during the early part of the process period while the bed of catalytic material is at a relatively low temperature while in the later stage of the process period when the catalyst bed is at a higher temperature a relatively unsaturated gasoline is obtained, which likewise is of high octane rating. The invention provides therefore for separately collecting the gasolines produced in both stages of processing since the substantially saturated gasoline is valuable as an aviation fuel, while the unsaturated gasoline is more valuable as a motor or blending fuel. It is, of course, known that with a low catalyst temperature a substantially saturated gasoline may be obtained. However, in the general type of low temperature operation extremely high losses are usually encountered due probably to the absorption of liquid material by the catalyst. My invention, therefore, provides a method for utilizing low catalyst bed temperatures to produce substantially saturated gasoline during the early stage of the process period, and as the catalyst activity decreases the temperature of the catalyst bed increases so that the rate of conversion is approximately uniform and, in addition, with the higher temperatures at the end of the processing period liquid materials absorbed by the catalytic material are vaporized and are readily purged from the reactor prior to the reactivation of the catalyst so that relatively low losses are encountered.

In one specific embodiment the invention comprises heating hydrocarbon reactants to a temperature in the range of 900 to 1050° F., passing the heated reactants in contact with a bed of catalytic material capable of promoting conversion thereof, withdrawing the conversion products during the entire processing period to a fractionator wherein the conversion products are fractionated into fractionated vapors boiling in the range of gasoline and intermediate conversion products, recovering the latter, separately condensing and collecting the fractionated vapors separated during the primary stage of the processing period and those separated during the later stage of the processing period to obtain a substantially saturated gasoline and an unsaturated gasoline, simultaneously therewith passing fresh reactivating gases containing controlled minor amounts of oxygen at a temperature of from 750 to 850° F. in contact with carbonized catalytic material until the mass is completely reactivated and cooled to approximately the temperature of the fresh reactivating gases.

Fig. 1 in the accompanying drawing illustrates diagrammatically in conventional side elevation one specific form of the apparatus which may be employed to accomplish the objects of the invention.

Figs. 2, 2A, 3, 3A are details of the four-way and three-way valves diagrammatically indicated as valves V1, V2, and V3 in Fig. 1.

Referring now to the drawing, the feed, preferably comprising a hydrocarbon oil amenable to catalytic cracking, such as, for example, gas oil, is introduced through line 1 and valve 2 to pump 3 which discharges through line 4 and valve 5 into heating coil 6. When desired, intermediate conversion products separated in the process in the manner to be described later may be commingled with the feed in line 4 and the mixture supplied to heating coil 6. The oil in passing through heating coil 6 is heated and vaporized therein at a temperature ranging, for example, from 900 to 1050° F., heat being supplied from furnace 7. The heated reactants leaving heating coil 6 at a pressure ranging from substantially atmospheric to 200 pounds or more per square inch are directed through line 8 to valve V1.

Switching of the stream of reactants and reactivating gases is accomplished by means of inlet valve V1 and the switching of the conversion products and spent reactivating gases is accomplished by means of valve V2. Any suitable valve arrangement capable of switching the direction of flow of reactants and reactivating gases may be employed within the scope of the invention. However, for the sake of simplifying the description and illustrating the process without unnecessary complications, each of the switching valves employed is illustrated as a four-way valve, the passageways of which may be shifted from the position illustrated in Fig. 2 to the position illustrated in Fig. 2A. Assuming for the purpose of illustration that reactor A is on process and the catalytic material in reactor B is undergoing reactivation, in which case valve V1 is adjusted to the position illustrated in Fig. 2 while valve V2 is adjusted to the position illustrated in Fig. 2A.

Reactants in line 8 are directed through valve V1 into line 10 by means of which they are supplied to reactor A. Preferably, the reactors designated as A and B in the accompanying drawing comprises insulated vessels and one or a plurality of beds of catalytic material whereby the reactions being accomplished may be carried out under substantially adiabatic conditions with no withdrawal or introduction of heat other than that withdrawn as sensible heat in the spent reactivating gases and conversion products and that supplied in the reactants and reactivating gases, respectively. The invention, however, is not limited to any specific type of reactor but may employ any of the well known types of reactors and, when desired, more than two reactors may be employed. Additional reactors may be required, for example, when the time required for reactivating the catalytic material in one reactor is greater than the processing time in the other reactor, for, in such cases, in order to make the operation continuous three or more reactors may be necessary.

Catalysts which have been found to be effective in the catalytic cracking of hydrocarbon vapors may comprise pellets or granules of silica or other siliceous and refractory materials composited with compounds selected from the group consisting of alumina, zirconia, vanadia, and thoria. In addition, the hydrosilicates of alumina, acid treated clays, or the like, have also been found to be effective in the cracking treatment of hydrocarbon vapors. Although the catalysts above recited are generally considered to be the preferred catalysts, their use is not to be construed as a limiting feature, for various other catalysts well known to those in the art may be employed within the broad scope of the invention.

The conversion products leaving reactor A are directed through line 12 to valve V2 wherethrough they pass into line 14 by means of which they are supplied to fractionator 16. Fractionator 16, preferably and in the case here illustrated, comprising a reactor of relatively low holdup, such as, for example, a packed column or, when desired, a centrifugal fractionating device characterized by the Podbielniak centrifugal separator, may be employed in order that rapid separation may be obtained between the gasoline boiling range hydrocarbons and the higher boiling intermediate conversion products. Intermediate conversion products separated in fractionator 16 are condensed and preferably separated into a light and heavy reflux condensate. The heavy reflux condensate, in the case here illustrated is withdrawn from the lower portion of fractionator 16 by way of line 17 and valve 18 and recovered as a product of the process or subjected to any desired further treatment.. Light reflux condensate separated in fractionator 16 is directed through line 19 and valve 20 to pump 21. Pump 21 discharges through line 22 and a portion or all of the light reflux condensate may be recovered as a product of the process by way of line 23 and valve 24. This light reflux condensate may, however, be subjected to further treatment, in which case it is directed through valve 25 into line 4, commingling therein with the feed as previously described.

Fractionated vapors separated in fractionator 16 are directed through line 26 to valve V3 which is adjusted to the position illustrated in Fig. 3 during the primary stage of the processing period in reactor A, say for example, during the first 5 to 30 minutes, at which time it is switched to the position illustrated in Fig. 3A. When valve V3 is adjusted to the position illustrated in Fig. 3 the fractionated vapors are directed through line 27 into condenser 28. Distillate, together with undissolved and uncondensed gases from condenser 28 is directed through line 29 and valve 30 into receiver 31 wherein the distillate and gas is collected and separated. Undissolved and uncondensed gases collected and separated in receiver 31 are withdrawn therefrom by way of line 32 and valve 33 and recovered as a product of the process or subjected to any desired further treatment. A portion of the distillate collected and separated in receiver 31 may be returned to the upper portion of fractionator 16 during the primary stage of the process as a refluxing and cooling medium, i. e., while the fractionated vapors are introduced to condenser 28. The remaining portion of the distillate collected and separated in receiver 31 is removed therefrom by way of line 34 and valve 35 and this distillate, which is substantially saturated in character, is recovered as a product of the process.

During the secondary stage of the processing period, that is after the 5 to 30 minutes have elapsed, the fractionated vapors in line 36 are directed through valve V3 into line 36 by means of which they are introduced to condenser 37. Distillate, together with undissolved and uncondensed gases from condenser 37, is directed through line 38 and valve 39 into receiver 40 wherein the distillate and gases are collected and separated. The gases are removed from receiver 40 by way of line 41 and valve 42. A portion of the distillate collected in this receiver may be returned to the upper portion of fractionator 16 by well known means, not shown, as a refluxing and cooling medium during the period in which fractionated vapors are condensed in condenser 37. The remaining portion of the distillate collected and separated in receiver 40, which contains a substantial portion of unsaturated hydrocarbons, is removed therefrom by way of line 43 and valve 44 and recovered as a product of the process.

The use of individual condensers and receivers for separately recovering the substantially saturated gasoline and the unsaturated gasoline is the preferred method for accomplishing this separation, however, the invention is not limited in this respect but may employ, for example, separate fractionating, condensing, and collecting equipment, in which case the conversion products formed in the primary stage of the processing period are fractionated and collected in one system while the conversion products formed in the stage following said primary stage are fractionated and collected in the other system.

Simultaneously, with the conversion treatment of hydrocarbon reactants in reactor A, the catalytic material contained in reactor B is subjected to reactivation. In accordance with the objects of the invention, this is accomplished by passing reactivating gases preferably comprising a non-oxidizing gas, such as combustion gases containing controlled amounts of oxygen, and heated to a temperature substantially in the range of 750 to 850° F. in contact with the material to be reactivated. This is accomplished by supplying fresh reactivating gases through line 9 to valve V1 wherethrough they pass into line 11 and thence into reactor B. Spent reactivating gases and combustion products from reactor B are directed through line 13 and valve V2 into line 15 after which a portion may be disposed of and the temperature and oxygen concentration of the remaining portion thereof readjusted to the desired value and the mixture recirculated as the fresh reactivating gases by well known means, not illustrated. In some cases, however, the use of fresh reactivating gases may be desirable, in which case the spent reactivating gases and combustion products may be disposed of, but preferably after extracting heat therefrom in suitable heat recovery equipment, not shown.

Ordinarily, during reactivation the temperature of the bed of catalytic material will increase due to the burning being effected, and it is preferred therefore after reactivation is substantially complete that the recirculation of substantially oxygen-free reactivating gases be continued until the bed of catalytic material is at substantially the same temperature as that of the gases being recirculated.

When the activity of the catalytic material in reactor A is materially impaired due to the deposition of carbonaceous material thereon at which time it becomes desirable to employ a fresh or freshly reactivating catalyst, valve V1 may be adjusted to the position illustrated in Fig. 2A and valve V2 adjusted to the position illustrated in Fig. 2, in which case the hydrocarbon reactants are supplied to reactor B and reactivating gases to reactor A, the flow thereafter being substantially as described.

An example of one specific operation of the process as it may be accomplished in an apparatus such as illustrated and above described is approximately as follows:

The feed comprising a 36° A. P. I. gravity Mid-Continent gas oil is heated to a temperature 950° F. and at a superatmospheric pressure of 40 pounds per square inch. The heated vapors are subjected to contact with a silica-alumina catalyst and the conversion products fractionated in a column packed with raschig rings operated at a superatmospheric pressure of approximately 20 pounds per square inch to separate gasoline boiling range hydrocarbons from the higher boiling intermediate conversion products. During the first 15 minutes of the processing period the gasoline boiling range hydrocarbons are supplied to separate condensing and collecting equipment from that to which the gasoline boiling range hydrocarbons formed in the remaining 45 minutes of the processing period are supplied and a substantially saturated gasoline recovered from the former while a substantially unsaturated gasoline is recovered from the latter.

Simultaneously with the hydrocarbon conversion treatment in one reaction zone the catalytic material in another reaction zone is subjected to reactivation in the presence of reactivating gases heated to a temperature of 800° F. and containing approximately 3% oxygen. When the reactivation is substantially complete in this reactor, substantially oxygen-free reactivating gases at a temperature of 800° F. are passed in contact with the catalytic material until the processing period is complete in the companion reactor, at which time the temperature of the bed of catalytic material previously reactivated will have been reduced to approximately 800° F.

When employing the above operating conditions approximately 13.8% of 85.5 octane number 8 bromine number gasoline, 22.5% of 79 octane number 82 bromine number gasoline, and 55.0% of intermediate conversion products may be obtained, the balance being principally gas and loss.

I claim as my invention:

1. A process for catalytically cracking hydrocarbon reactants which comprises heating said hydrocarbon reactants to a temperature in the range of 900 to 1050° F., passing the resulting heated reactants in contact with a bed of catalytic material capable of promoting conversion thereof which is at a temperature below that of said reactants, fractionating the conversion products to substantially separate fractionated vapors boiling in the range of gasoline from intermediate conversion products, separately recovering the fractionated vapors separated during the primary and final stages of the processing period to obtain a substantially saturated gasoline and an unsaturated gasoline, periodically diverting the flow of hydrocarbon reactants to said bed and subjecting the catalytic material to reactivation in situ in the presence of an oxygen-containing reactivating gas heated to a temperature in the range of 750 to 850° F., withdrawing the resulting reactivating gases and combustion products, cooling the catalytic material after reactivation by continuously recirculating substantially oxygen-free gases heated to a temperature of from 750 to 850° F. and then resuming the passage of hydrocarbon reactants therethrough as aforesaid.

2. A process defined in claim 1 further characterized by the step which comprises commingling the intermediate conversion products with the hydrocarbon reactants for further treatment thereof.

3. A hydrocarbon oil conversion process which comprises providing a bed of freshly reactivated cracking catalyst at a temperature in the range of 750 to 850° F., continuously passing through said bed during its processing period a stream of hydrocarbons heated to a temperature in the range of 900 to 1050° F., maintaining the catalyst bed during the initial portion of said period at relatively low conversion temperature such as to produce a substantially saturated gasoline, and, during a subsequent portion of the processing period, maintaining said bed at higher conversion temperature such as to produce an unsaturated gasoline.

4. A hydrocarbon oil conversion process which comprises providing a bed of freshly reactivated cracking catalyst at a temperature in the range of 750 to 850° F., continuously passing through said bed during its processing period a stream of hydrocarbons heated to a temperature in the range of 900 to 1050° F., maintaining the catalyst bed during the initial portion of said period at relatively low conversion temperature such as to produce a substantially saturated gasoline, and, during a subsequent portion of the processing period, maintaining said bed at higher conversion temperature such as to produce an unsaturated gasoline, and separately collecting said substantially saturated gasoline and said unsaturated gasoline.

5. A hydrocarbon oil conversion process which comprises providing a bed of freshly reactivated cracking catalyst at a temperature in the range of 750 to 850° F., continuously passing through said bed during its processing period a stream of hydrocarbons heated to a temperature in the range of 900 to 1050° F., maintaining the catalyst bed during the initial portion of said period at relatively low conversion temperature such as to produce a substantially saturated gasoline, and, during a subsequent portion of the processing period, maintaining said bed at higher conversion temperature such as to produce an unsaturated gasoline, thereafter reactivating said bed in situ in a regenerating stage whose final temperature is in the range of 750 to 850° F., and then resuming the passage of the hydrocarbon stream therethrough as aforesaid.

KENNETH M. WATSON.